Figure 1:
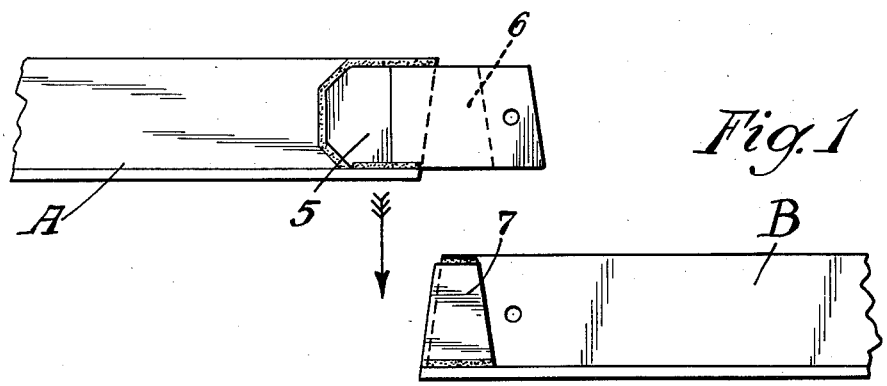

June 13, 1950  R. HUSÁK  2,511,532
CONTACT JOINT OF METAL CONSTRUCTION RODS
Filed Aug. 1, 1947

Inventor
Robert Husák
by Singer, Ehlert, Stern & Carlberg
Attorneys

UNITED STATES PATENT OFFICE 2,511,532

CONTACT JOINT OF METAL CONSTRUCTION RODS

Robert Husák, Prague, Czechoslovakia

Application August 1, 1947, Serial No. 765,474
In Czechoslovakia August 9, 1946

2 Claims. (Cl. 287—103)

Figure 2:
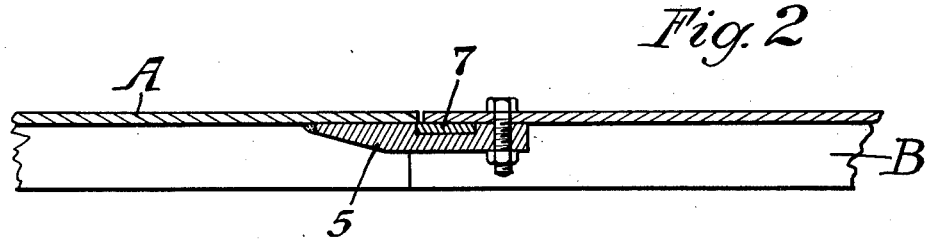

The contact joint of metal rods, strips or girders according to the present invention is brought about by the engagement of a claw provided on the extremity of one of the rods or girders on a projection of the other rod of the joint. Said claw and projection are beveled so as to facilitate the joint by bringing them into mutual engagement through a movement in a direction perpendicular to the axis of said rods. The contact joint may be secured against release by a screw or otherwise. It is not necessary to take into account the cooperation of said screw in transmitting the main force. In the drawing:

Fig. 1 illustrates the extremities of two angle rods before assembling. Their joint is brought about by inserting the extremity A in the direction of the arrow indicated. Fig. 2 illustrates a plan view of the assembled angle rods, with certain parts in section.

As shown in Figs. 1 and 2, the angle iron A has a plate 5 welded to the inner face of one of its legs. This plate 5 extends a considerable distance beyond the end of the angle iron and its projecting portion is provided in the face directed toward the inner face of the leg with a transverse shallow groove or recess 6 having two opposed inclined side walls shown in dotted lines in Fig. 1. The other angle iron B has fixedly attached, as by welding, to the inner face of one of its legs, a plate 7 which extends across the entire height of the leg and projects only a very small distance beyond the end of the angle iron. The plate 7 is adapted to lockingly enter the transverse groove or recess 6 in the plate 5 when the two angle irons, by the indicated transverse movement, are brought in alinement with each other.

In the above described manner a mechanical connection of joined rods is carried into effect suitable for transmitting thrust and pull and, if needed, also bending stresses. An advantage of such contact joint lies in the fact that there is no need of providing rivets, bolts or welding for the joint proper, so that the joining operation is extremely time saving. By the contact joint it is not necessary to transmit the entire force between the rods, the deviating flanges being connected in the familiar way. Contact joints may be preferably used in those cases where a quick assembling and dismantling of the whole structure is strictly required.

I claim:

1. Means for connecting two angle iron bars end to end comprising a plate secured to the inner face of one leg at the end of one angle iron, said plate extending substantially across the entire height of said leg to form an inwardly extending projection on said leg, another plate secured to the inner face of one leg of the other angle iron and extending longitudinally beyond the end of said last named angle iron, the portion of said last named plate which extends beyond the end of the said last named angle iron having a recess in its face which is directed toward the inner face of the leg of said angle iron, said recess being provided for lockingly receiving the plate attached to one leg of said first named angle iron when the two angle irons are moved transversely to their longitudinal direction in alinement with each other.

2. Means for connecting two angle iron bars end to end comprising a plate secured to the inner face of one leg at the end of one angle iron, said plate extending substantially across the entire height of said leg and having two opposed side edges tapering toward the outer edge of said leg to form an inwardly extending wedge-like projection on said leg, another plate secured to the inner face of one leg of the other angle iron and extending longitudinally beyond the end of said last named angle iron, the portion of said last named plate which extends beyond the end of the said last named angle iron having a recess in its face which is directed toward the inner face of the leg of said angle iron, said recess having two opposed inclined side walls and being provided for lockingly receiving the plate attached to one leg of said first named angle iron when the two angle irons are moved transversely to their longitudinal direction in alinement with each other.

ROBERT HUSÁK.

REFERENCES CITED

The following references are of record in the file of this patent:

UNITED STATES PATENTS

| Number | Name | Date |
|---|---|---|
| 19,945 | Nowlan | Apr. 13, 1858 |
| 143,862 | White | Oct. 21, 1873 |
| 197,667 | Roberts | Nov. 27, 1877 |
| 334,929 | Black | Jan. 26, 1886 |
| 348,944 | Allen | Sept. 14, 1886 |
| 489,831 | Reneau | Jan. 10, 1893 |
| 596,490 | Edwards | Jan. 4, 1898 |
| 616,131 | McAfee | Dec. 20, 1898 |
| 736,874 | Quinn | Aug. 18, 1903 |
| 1,988,150 | Austin | Jan. 15, 1935 |
| 2,147,878 | Burmeister | Feb. 21, 1939 |

FOREIGN PATENTS

| Number | Country | Date |
|---|---|---|
| 345,522 | Germany | Dec. 12, 1921 |
| 11,858 | Great Britain | May 13, 1898 |